United States Patent
Cunneen et al.

(10) Patent No.: US 8,260,148 B2
(45) Date of Patent: Sep. 4, 2012

(54) DEVICE FOR TRANSMITTING AND RECEIVING DVI VIDEO OVER A SINGLE FIBER OPTIC INTERCONNECT

(75) Inventors: James Cunneen, Villa Park, IL (US); Danny E. Holland, Huntsville, AL (US); Anthony S. Kowalkowski, Chicago, IL (US); Luis Torres, Rolling Meadows, IL (US)

(73) Assignee: Stratos International, Inc., Bannockburn, IL (US)

( * ) Notice: Subject to any disclaimer, the term of this patent is extended or adjusted under 35 U.S.C. 154(b) by 911 days.

(21) Appl. No.: 12/231,574

(22) Filed: Sep. 4, 2008

(65) Prior Publication Data
US 2009/0067853 A1    Mar. 12, 2009

Related U.S. Application Data

(60) Provisional application No. 60/967,909, filed on Sep. 7, 2007, provisional application No. 60/967,551, filed on Sep. 5, 2007.

(51) Int. Cl.
*H04B 10/12* (2006.01)
*H04B 10/04* (2006.01)
*H04B 10/06* (2006.01)

(52) U.S. Cl. ........ 398/141; 398/140; 398/142; 398/115; 398/139; 398/202; 398/214; 398/182; 385/100

(58) Field of Classification Search .................. 398/107, 398/113, 115–117, 140–142, 164, 182, 200, 398/202, 207, 214; 345/520, 544; 385/100; 359/245
See application file for complete search history.

(56) References Cited

U.S. PATENT DOCUMENTS

| | | | |
|---|---|---|---|
| 6,856,435 B2 | 2/2005 | Richard et al. | |
| 6,897,793 B1 | 5/2005 | Kim et al. | |
| 6,912,008 B2 | 6/2005 | Mair et al. | |
| 6,914,637 B1 | 7/2005 | Wolf et al. | |
| 6,914,676 B2 | 7/2005 | Richard et al. | |
| 6,940,477 B2 | 9/2005 | Moon et al. | |
| 6,954,234 B2 | 10/2005 | Leyvi et al. | |
| 7,024,601 B2 | 4/2006 | Quinlan et al. | |
| 7,024,607 B2 | 4/2006 | Warner et al. | |
| 7,065,604 B2 | 6/2006 | Konda et al. | |
| 7,085,497 B2 * | 8/2006 | Tiemann et al. | 398/107 |

(Continued)

OTHER PUBLICATIONS

Digital Display Working Group, Digital Visual Interface DVI, revision 1.0, Apr. 2, 1999, found at a web site at http://www.ddwg.org/lib/dvi_10.pdf.

(Continued)

*Primary Examiner* — Loha Ben
(74) *Attorney, Agent, or Firm* — Karl D. Kovach (57) ABSTRACT

A transmitting device includes a housing, a multichannel transmitter optical subassembly, a microcontroller, and a DVI connector. The housing has only one optical port, where the only one optical port is adapted to receive only one optical fiber. The multichannel transmitter optical subassembly is mechanically associated with the housing. The microcontroller is electrically associated with the multichannel transmitter optical subassembly. The DVI connector is mechanically associated with the housing. The transmitting device is adapted to convert at least four electrical TMDS signals into optical paths that are transmittable over the only one optical fiber. A receiving device is similar to the transmitting device, however, in contrast to the transmitting device, the receiving device includes a multichannel receiver optical subassembly, and wherein the receiving device is adapted to convert multiple colored wavelengths into at least four electrical TMDS signals.

20 Claims, 11 Drawing Sheets

U.S. PATENT DOCUMENTS

| | | |
|---|---|---|
| 7,088,398 B1 | 8/2006 | Wolf et al. |
| 7,099,416 B2 | 8/2006 | Pasqualino et al. |
| 7,120,203 B2 | 10/2006 | Bauch et al. |
| 7,138,989 B2 * | 11/2006 | Mendelson et al. .......... 345/204 |
| 7,176,980 B2 | 2/2007 | Stone et al. |
| 7,184,621 B1 | 2/2007 | Zhu |
| 7,203,426 B2 | 4/2007 | Wu et al. |
| 7,210,859 B2 | 5/2007 | Kumar et al. |
| 7,729,618 B2 * | 6/2010 | Tatum et al. .................. 398/139 |
| 7,860,398 B2 * | 12/2010 | Tatum et al. .................. 398/141 |
| 2005/0180700 A1 | 8/2005 | Farr |
| 2006/0067690 A1 | 3/2006 | Tatum et al. |
| 2006/0077778 A1 | 4/2006 | Tatum et al. |

OTHER PUBLICATIONS

Silicon Image, White paper entitled Digital Visual Interface & TMDS Extensions, Oct. 2004, found at a web site at http://www.siliconimage.com/docs/Sil-WP-007-A.pdf.

Infocus Corporation, White paper entitled Digital Visual Interface (DVI), Nov. 2001, found at a web site at http://www.infocus.com/service/tech_library/pdfs/DVI-WhitePaper.

* cited by examiner

DEVICE FOR TRANSMITTING AND RECEIVING DVI VIDEO OVER A SINGLE FIBER OPTIC INTERCONNECT

This non-provisional application claims the priority of earlier filed U.S. Provisional Application Ser. Nos. 60/967,909, filed Sep. 7, 2007, and 60/967,551, filed Sep. 5, 2007. U.S. Provisional Patent Application Ser. Nos. 60/967,909, and 60/967,551 are hereby incorporated herein by reference.

BACKGROUND OF THE INVENTION

1. Field of the Invention

The present invention represents a method of intelligent signal distribution for matching transmitter and receiver devices provided by attaching both devices together by means of a single fiber optic cabling scheme.

2. Discussion of the Background

As digital distribution and media converter gear for transporting video images start to replace traditional analog Video Graphics Array (VGA), the amount of data required to maintain a quality image becomes more critical.

One of the most popular digital interfaces is the Digital Video Interface (DVI). This interface includes high speed signal transmission lines without signal compression, an Extended Display Identification Data (EDID) memory to hold information such as signal formatting, and a Display Data Channel (DDC) for reading out the information from EDID. Further, the DVI includes a Hot Plug Detect (HPD) line for giving notice of the status of the information recorded in the EDID memory.

Two prior concepts to DVI signal transport of fiber optic cable are recognized. One type incorporates the inclusion of four separate and independent physical interconnects for four channels of Transition Minimized Differential Signals (TMDS) (also recognized as RGB, Clock data) that is passed to a receiver device over four separate fiber optic cables. Each cable is critical to the proper signal distribution between devices. Thus, in this concept, each of the optoelectronic interconnection devices includes four optical ports for receiving the four optical fibers. Clock data and R, G, B information are transported along the respective four optical fibers. Another type of DVI fiber transport includes a mechanical housing for the DVI connector which incases a fixed length multi-channel fiber optic to the transmitter and receiver devices. The type of device requires the end user to specify an exact length of fiber optic cable which cannot be altered or adjusted by the end user.

Both of these prior concepts prove to be inadequate for efficient fiber optic interconnects. Multiple fiber optic cables to a single device creates an excessive burden in cost and construction of transmitter and receiver interconnects. Fixed length concepts require precise measurements prior to assembly and burden the end user with additional risk should damage occur to either the cable housing or breakage to one of the fiber cables inside the housing.

SUMMARY OF THE INVENTION

In a similar case of interconnect requirements, this device allows the end user to interconnect a transmitter and receiver with one fiber optic cable. This simplifies and reduces the number of cables needed for interconnecting. Furthermore, utilizing a separate and independent fiber optic cable allows the end user to determine length requirements and change or adjustment needs.

In one form of the invention, the device takes the form of a transmitting device where the transmitting device includes a housing, a multichannel transmitter optical subassembly (multichannel TOSA), a microcontroller, and a DVI connector. The housing includes only one optical port where the only one optical port is adapted to receive only one optical fiber. The multichannel TOSA is mechanically associated with the housing. The microcontroller is electrically associated with the multichannel TOSA. The DVI connector is mechanically associated with the housing and is electrically associated with the microcontroller and the multichannel TOSA. The transmitting device is adapted to convert at least four electrical TMD signals into optical paths that are transmittable, in multiple colored wavelengths, over the only one optical fiber.

In a second form of the invention, the device takes the form of a receiving device where the receiving device includes a housing, a multichannel receiver optical subassembly (multichannel ROSA), and a DVI connector. The housing includes only one optical port where the only one optical port is adapted to receive only one optical fiber. The multichannel ROSA is mechanically associated with the housing. The DVI connector is mechanically associated with the housing and is electrically associated with the multichannel ROSA. The receiving device is adapted to convert multiple colored wavelengths, received over the only one optical fiber, into at least four electrical TMD signals.

In a third form of the invention, the device includes a cable, and the transmitting and receiving devices, as above described. The cable connects to each of the transmitting device and the receiving device so as to interconnect the transmitting device and the receiving device.

Thus, the invention achieves the objectives set forth above. The invention provides a device which lowers part count, and enables the use of a cable length which does not need to be precisely calculated and cut.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

In order to solve the problems mentioned above and to achieve the purpose mentioned above, the DVI fiber optic extender devices of the present inventions include: a transmitter apparatus, or transmitting device, allowing transport of DVI dual link over one fiber optic cable; a receiver apparatus, or receiving device, allowing the receipt of DVI dual link over one fiber optic cable; a memory for storing information; a reading channel for reading information out of output destination devices; a Universal Serial Bus (USB) input device for power and memory management; and an Light Emitting Diode (LED) device which identifies the power on and signal on state of the device.

Figure 1:
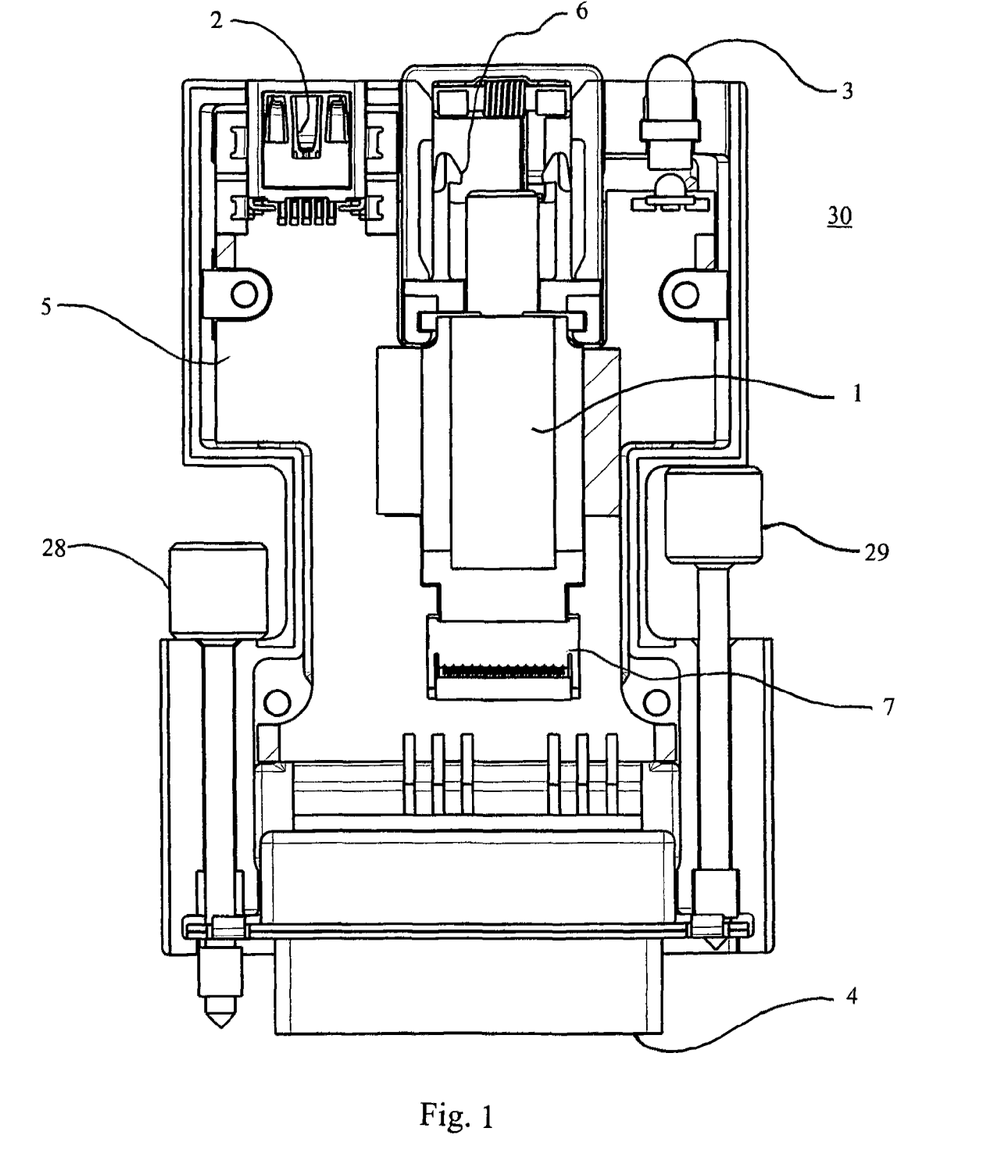
FIG. 1 is a cross-sectional side view showing the physical location of key components of the transmitter apparatus of the invention.

FIG. 1 discloses the major components of the transmitting device 30. Numeral designator 1 identifies a multichannel transmitter optical subassembly that is connected to the output processing circuit located on the printed circuit (PC) board 5 through a zero insertion force (ZIF) socket connector 7. The multichannel transmitter optical subassembly 1 supports multiple wavelengths in the TOSA which are programmed through a serial interface from a microcontroller 8 (see FIG. 6). The multichannel transmitter optical subassembly 1 contains laser drivers for each of the multilane serial interfaces to enable the microcontroller 8 to read/write to internal data registers. The USB interface is based on a mini-USB connector 2 mounted to the main PC board 5 assembly. The LED indicator 3 is driven via 3.3V and provides indicator status for power on (red) and control active (green). The DVI Connector 4 is based on either a single link plug or dual link plug depending on the type of DVI video transport needed. The multichannel transmitter optical subassembly 1 is secured to the housing via a Stratos International, Inc., designed mechanical housing 6. The housing 6 is adapted to receive only a single optical fiber which is housed in a connector where the connector conforms to a standard SC connector. However, any connector type can be used. Fasteners 28, 29 are used to secure the pluggable transmitting device 30 to another structure such as a signal sending device.

Figure 2:
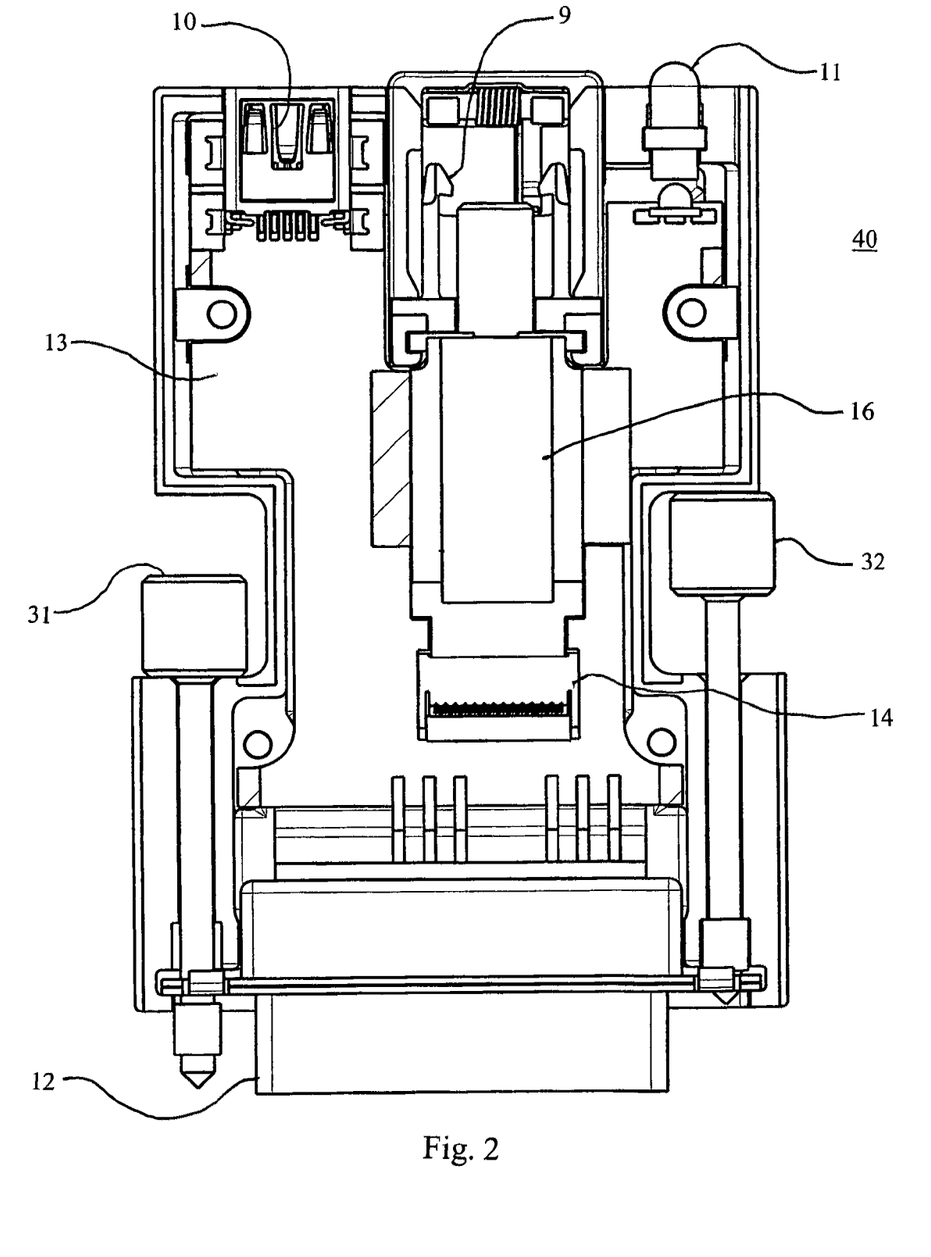
FIG. 2 is a cross-sectional side view showing the physical location of key components of the receiver apparatus of the invention.

FIG. 2 discloses the major components of the receiving device 40. Numeral designator 16 identifies a multichannel receiver optical subassembly that is connected to the output processing circuit located on the PC board 13 through a ZIF socket connector 14. The multichannel receiver optical subassembly 16 supports multiple wavelengths in the ROSA. The multichannel receiver optical subassembly 16 contains amplifiers for each of the multilane serial interfaces. The USB interface is based on a mini-USB connector 10 mounted to the PC board 13 assembly. The LED indicator 11 is driven via 3.3V and provides indicator status for power on (red) and control active (green). The DVI Connector 12 is based on either a single link plug or dual link plug depending on the type of DVI video transport needed. The optical subassembly 16 is secured to the housing via a Stratos International, Inc., designed mechanical housing 9. Fasteners 31, 32 are used to secure the pluggable receiving device 40 to another structure such as a computer monitor or plasma display.

Figure 3:
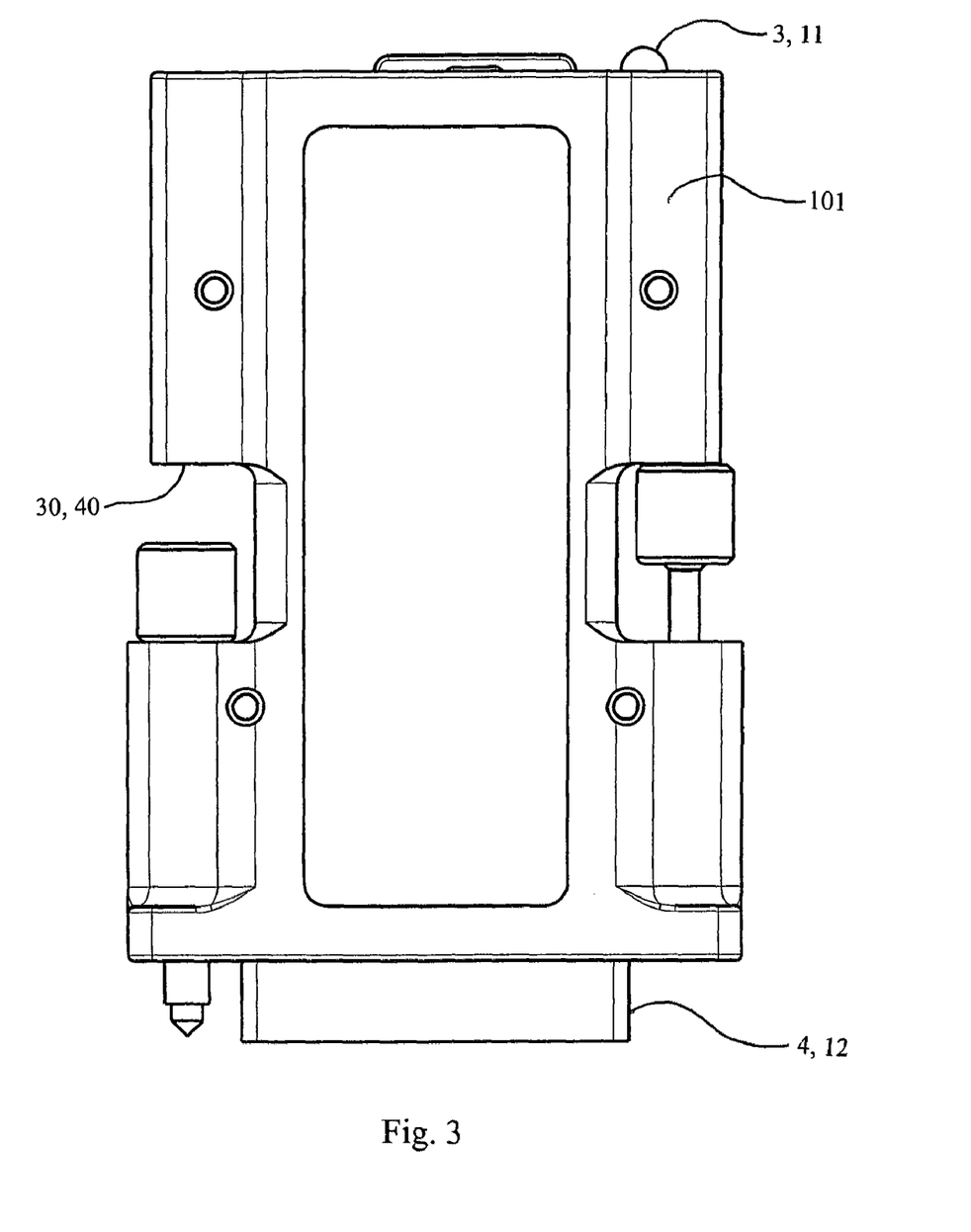
FIG. 3 is a side view of either one of the transmitting device and the receiving device of FIGS. 1 and 2, respectively.

FIG. 3 is a side view of either one of the device 30, 40 which shows the outer portion 101 of the housing that is made of a metallic material and which further shows the DVI connector 4, 12 and the LED indicator 3, 11.

Figure 4:
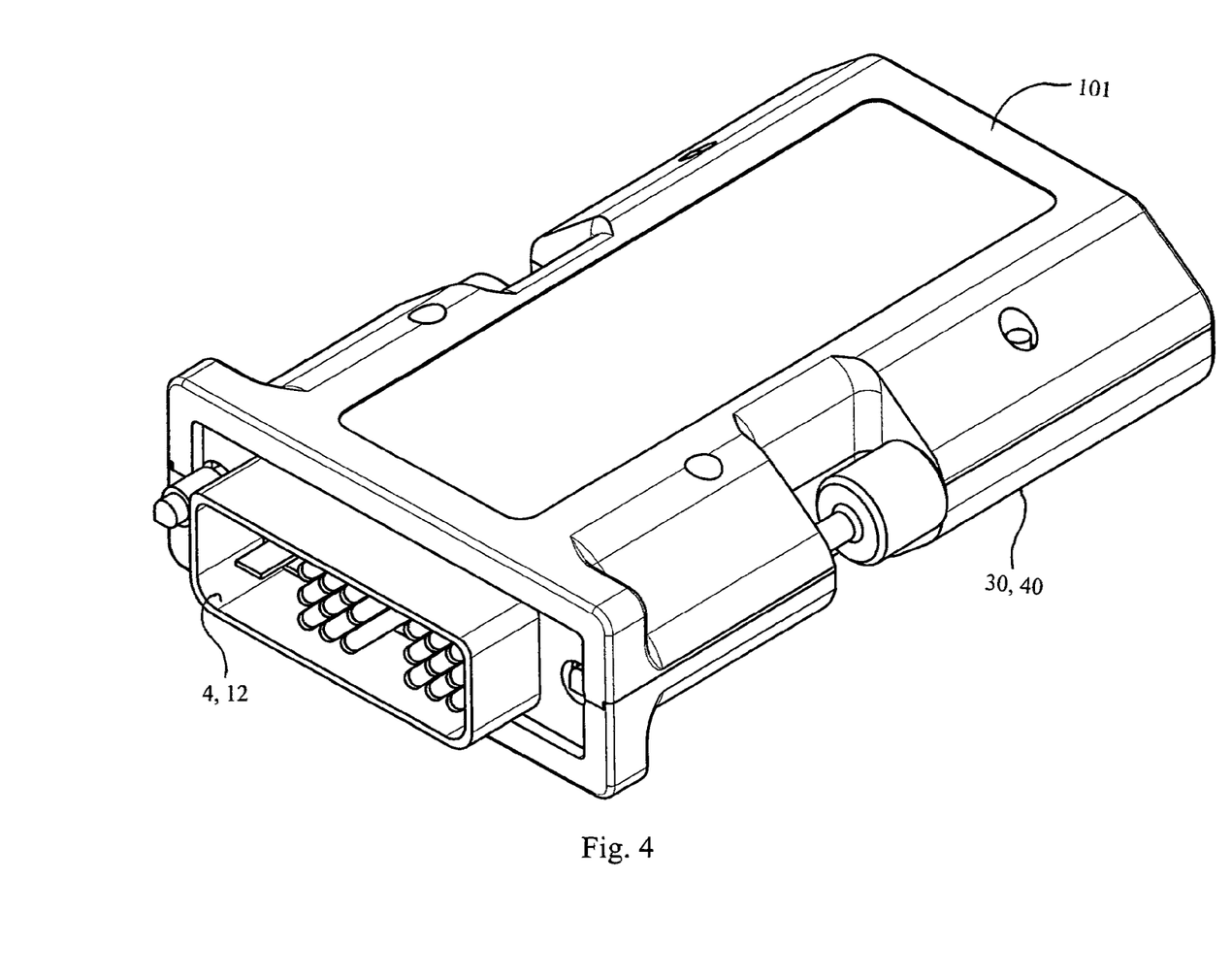
FIG. 4 is a perspective view of either one of the transmitting device and the receiving device of FIGS. 1 and 2, respectively.

FIG. 4 is a perspective view of either one of the devices 30, 40 which further shows the DVI connector 4, 12.

Figure 5:
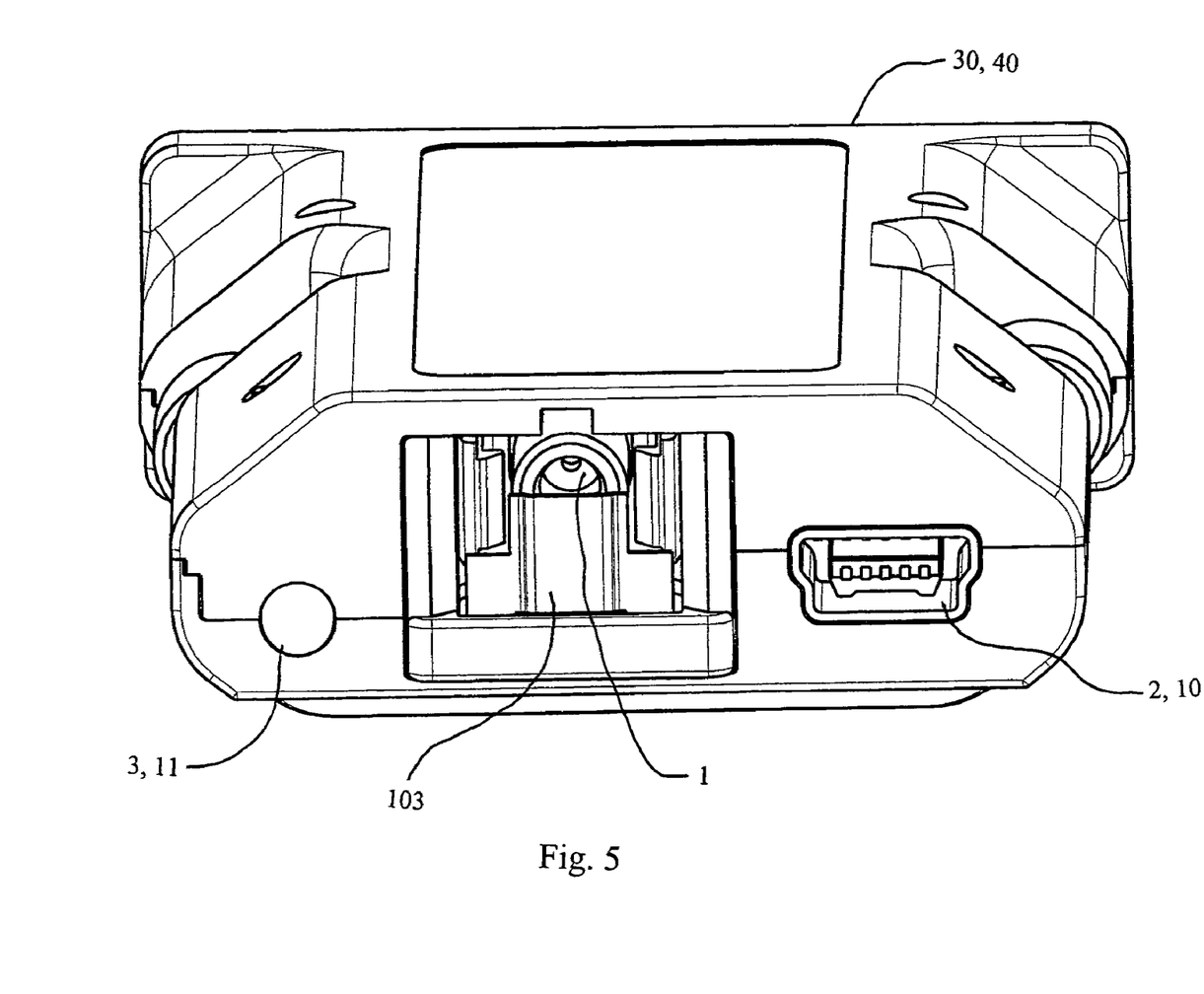
FIG. 5 is a perspective view of either one of the transmitting device and the receiving device of FIG. 4 taken at a different angle.

FIG. 5 is a perspective view of the device 30, 40 of FIG. 4 taken at a different angle and magnified so as to show the mini-USB connector 2, 10, the LED indicator 3, 11, and a shutter 103 pivotally attached to the housing. The shutter is included out of concern for the person installing and performing maintenance on the transmitter device 30. If the transmitter device 30 is plugged into the computer and the fiber optic connector is not attached to the device 30, then the possibility exists that the multichannel transmitter optical subassembly 1 will emit a light signal where the light signal may be damaging to the human eye. When the fiber optic cable is connected to the device 30, the shutter 103 pivots to a generally flat position so that the fiber optic connector can be fully introduced into and latch with the housing 6. When the fiber optic cable is removed from the device 30, the spring loaded shutter 103 moves into the position shown on FIG. 5. In such a position any light energy emitted from the multichannel transmitter optical subassembly 1 will impinge the shutter 103 and will not directly enter the eye of a person. When the light signal impinges the shutter 103, some of the light signal is reflected back and the remaining light signal is diffused and scattered so as to lower the energy level of the emitted light signal on a per unit area basis, and to make the light divergent, thus rendering harmless the emitted light signal. For simplicity of manufacturing, the receiving device 40 also includes the shutter 103. However, the receiving device 40 does not need a shutter 103 since the receiving device 40 does not emit light signals, it only received light signals.

Not currently implemented, but it is envisioned that the apparatuses 30, 40 in FIG. 1 and FIG. 2 can be powered via the 5V power pin located on the DVI connector 4, 12 and from the 5V power pin located on the mini-USB connector 2, 10 with only one of the sources required for powering the apparatus. Receiving power to the unit is automatic based on which pin is providing power to the power manager circuit with a default setting for power provided from the mini USB connector 2, 10. The microcontroller 8 is programmed to define power management with an override routine loaded into memory which allows user intervention for setting which port will drive power to the unit. The apparatuses 30, 40 will accept power voltage ranging from 3.7 VDC to 5.5 VDC and is internally regulated. Additionally, each of the apparatuses 30, 40 includes a slow start circuit to limit current rush to prevent over-current damage during hot plugging.

Figure 6:
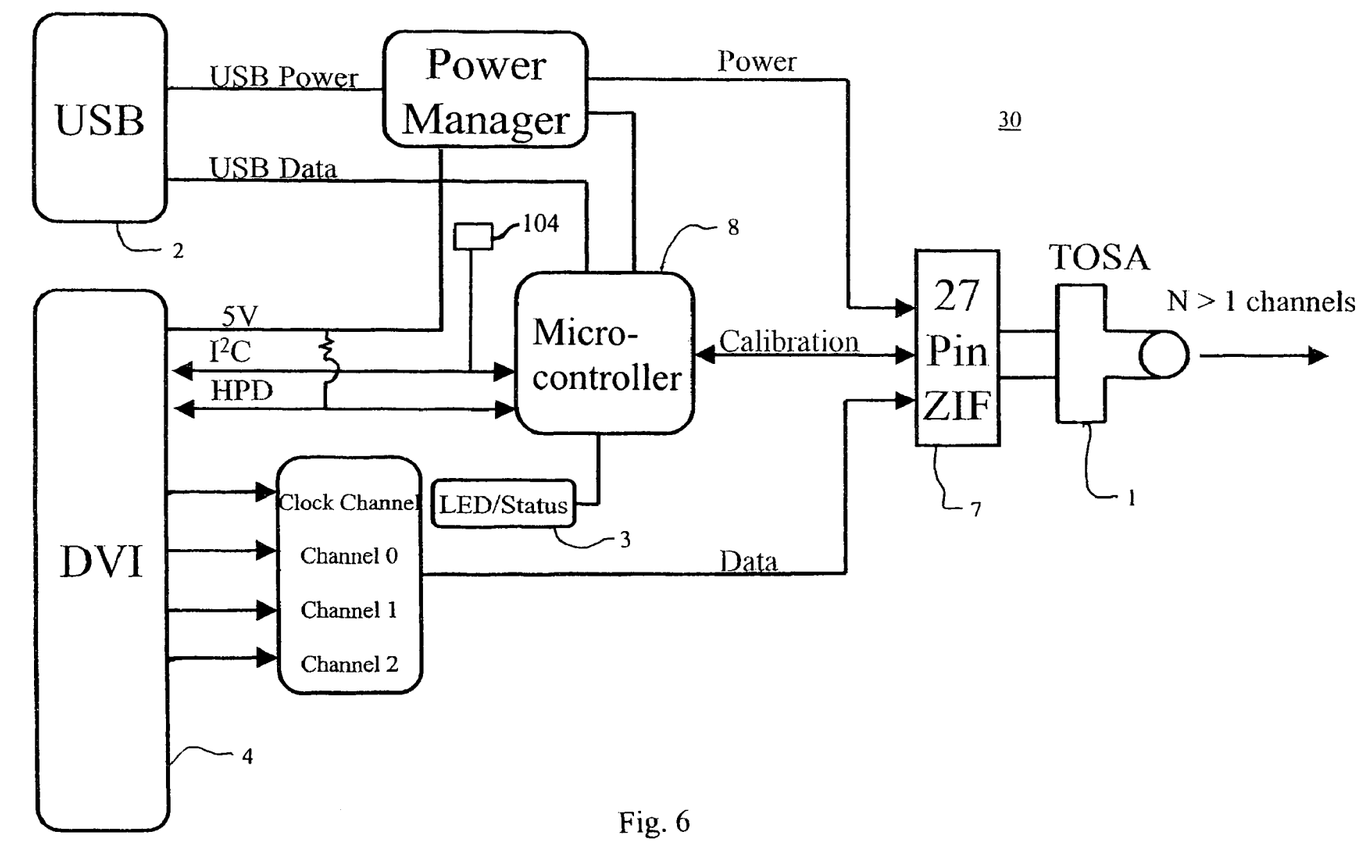
FIG. 6 is a block diagram showing the configuration of signal flow through the transmitter apparatus of FIG. 1 when defined as DVI single link.

FIG. 6 is a flow diagram of the transmitting device 30 showing Single Link DVI. The USB power flows through a power management circuit to provide voltage to the microprocessor and TOSA. The Microprocessor is powered by 5V and is controlled via an I$^2$C 12C control management protocol. The DVI interface 4 is based on TMDS video data transports and clock channels. Each channel is defined as Channel 0, Channel 1, Channel 2, and Clock Channel that supports RGB+Clock transports for DVI signals. Further illustrated is a 27 pin ZIF connector 7 for signal transport between the PCB 5 circuit and the multichannel transmitter optical subassembly 1. The diagram also includes an I$^2$C EEPROM 104. A one thousand ohm resistor is shown between the HPD and the 5V.

Figure 7:
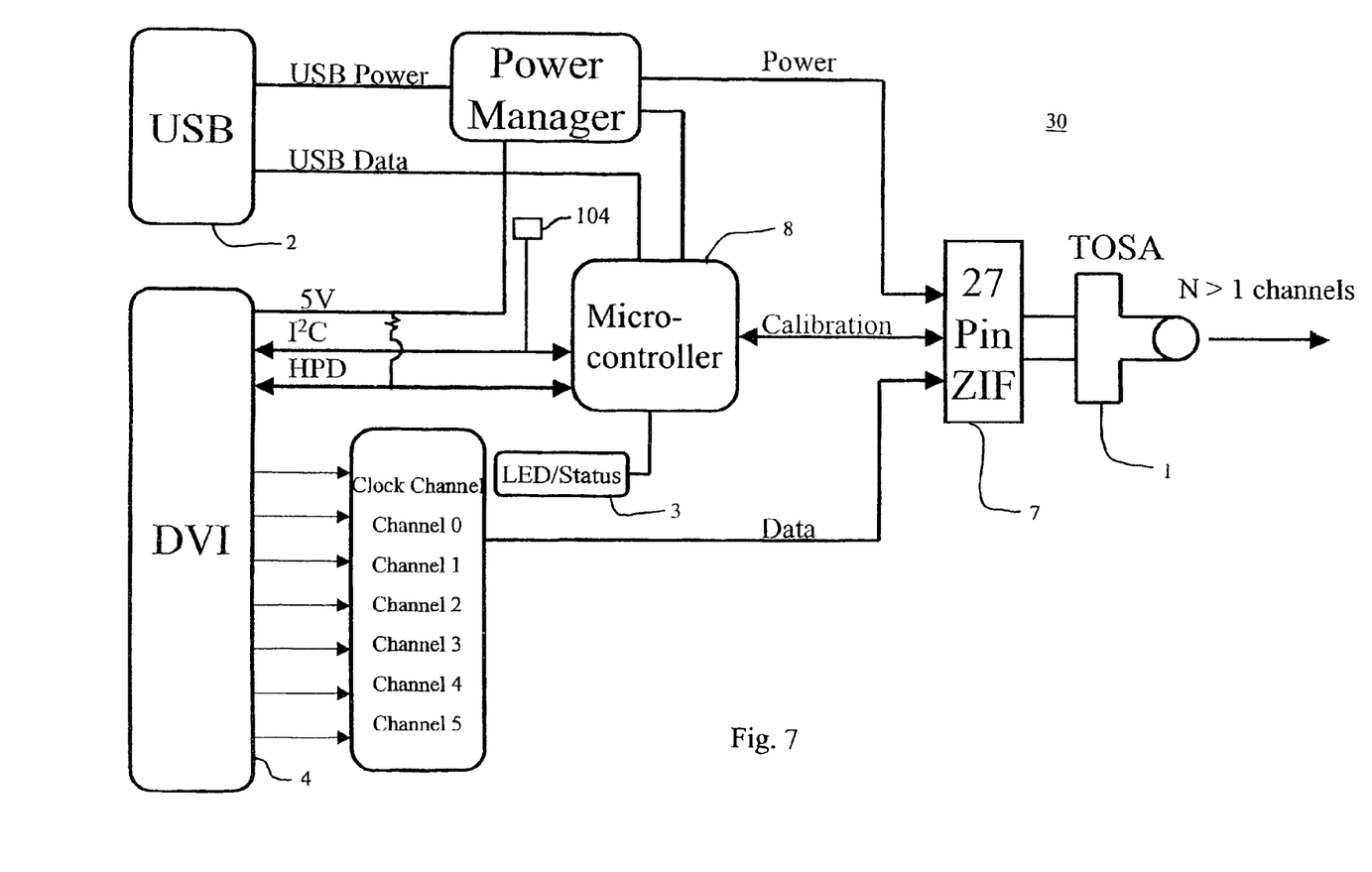
FIG. 7 is a block diagram showing the configuration of the signal flow through the transmitter apparatus of FIG. 1 when defined as DVI dual link.

Not currently implemented, but it is envisioned that a dual link channel DVI transmitting device can be made. FIG. 7 discloses the DVI dual link channels supported as Channel 0, Channel 1, Channel 2, Channel 3, Channel 4, Channel 5, and Clock Channel. This allows transport of two DVI channels defined as RGB odd channels, RGB even channels, and shared clock. The remainder of the schematic is similar to the schematic disclosed in FIG. 6.

Figure 8:
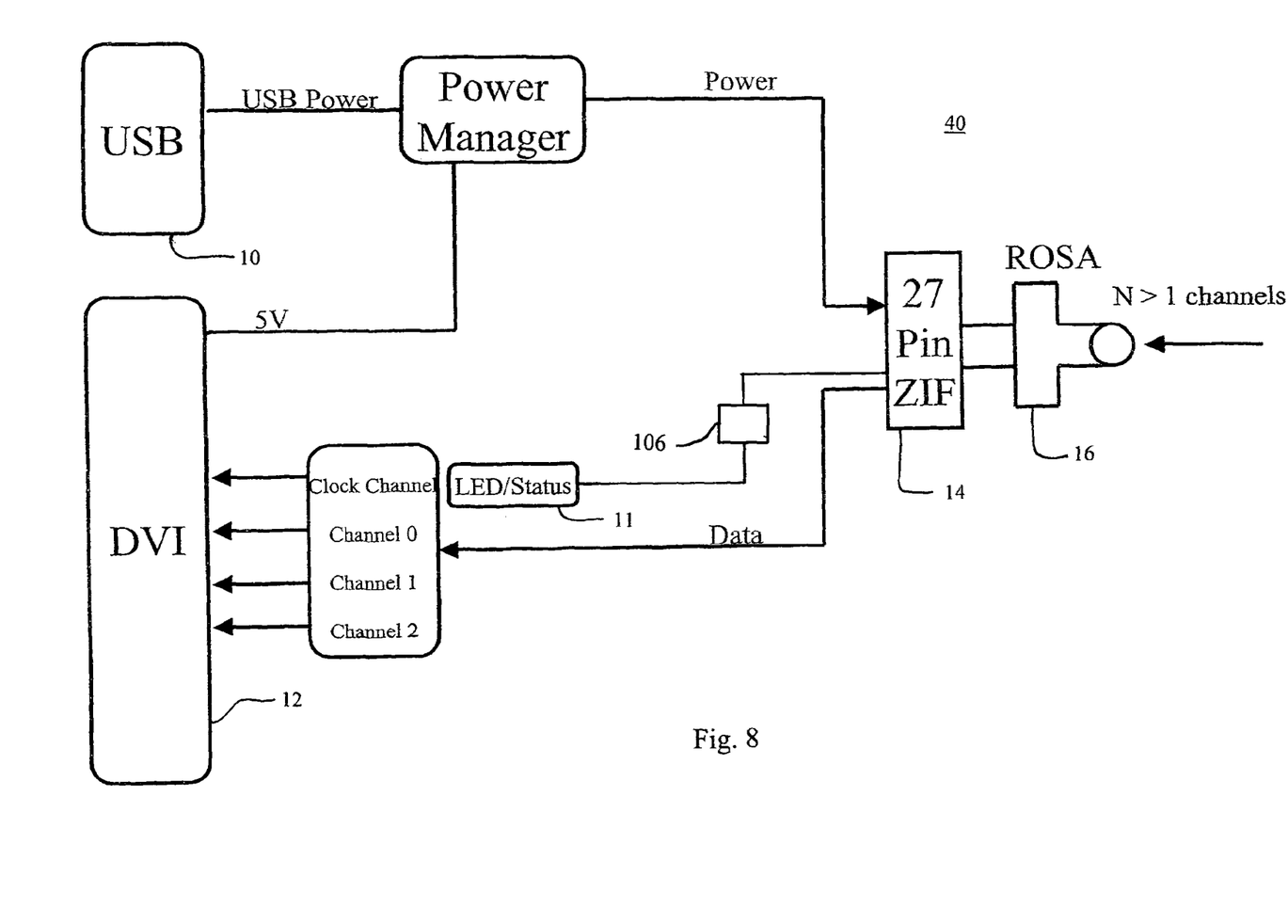
FIG. 8 is a block diagram showing the configuration of signal flow through the receiver apparatus of FIG. 2 when configured as DVI single link.

FIG. 8 is a flow diagram of the receiving device 40 showing Single Link DVI. The USB power flows through a power management circuit to provide voltage to the ROSA. The DVI interface 12 is based on TMDS video data transports and clock channels. Each channel is defined as Channel 0, Channel 1, Channel 2, and Clock Channel that supports RGB+ Clock transports for DVI signals. Further illustrated is a 27 pin ZIF connector 14 for signal transport between the PCB 13 circuit and the multichannel receiver optical subassembly 16. A logical gate 106 is associated with the LED indicator 11 so as to enable the LED indicator 11 to display the appropriate signal based on the ROSA signal level. If the ROSA signal level is too low then the signal level is characterized as a loss of signal or LOS.

Figure 9:
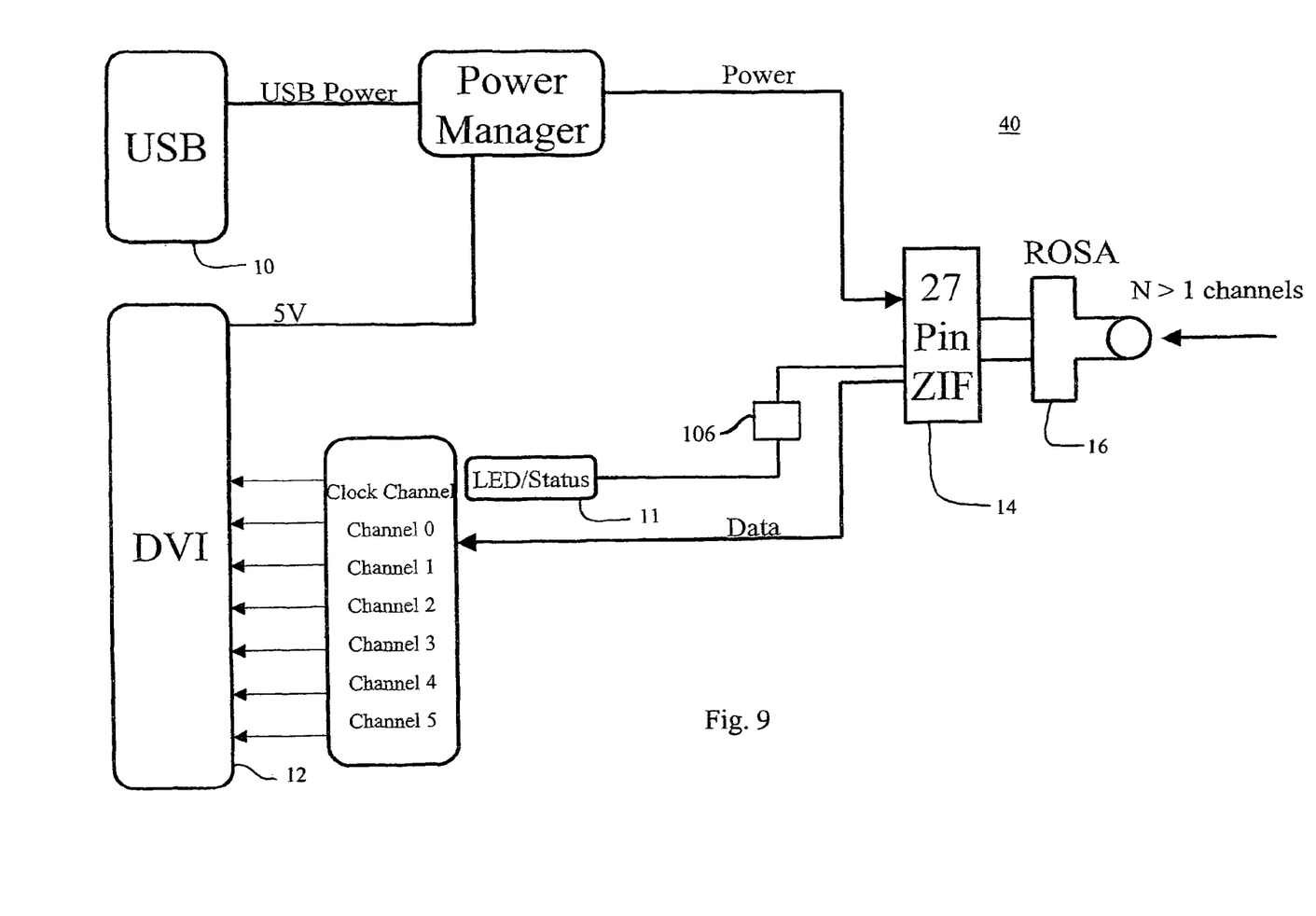
FIG. 9 is a block diagram showing the configuration of signal flow through the receiver apparatus of FIG. 2 when configured as DVI dual link.

Not currently implemented, but it is envisioned that a dual link channel DVI receiving device can be made. FIG. 9 discloses the DVI dual link channels supported as Channel 0, Channel 1, Channel 2, Channel 3, Channel 4, Channel 5, and Clock Channel. This allows transport of two DVI channels defined as RGB odd channels, RGB even channels, and shared clock. The remainder of the schematic is similar to the schematic disclosed in FIG. 8.

Thus, a method and apparatus have been disclosed for a fiber optic DVI and HDMI communication system including a receiver, a transmitter, and a singular fiber optic interconnect comprising one or more video channels between the transmitter and receiver, wherein the transmitter is configured to generate Transition Minimized Differential Signals (TMDS) and deliver it over plural lightwaves of Coarse Wave Division Multiplex (CWDM) and transmit active signals to the receiver device over a single fiber optic cable. This method permits a user to extend DVI and HDMI computer video signals over greater distances than described by the Digital Display Working Group standard of 5 meters. The communication system also eliminates the need for multiple strands of fiber optic cable to transmit for each of the four channels in the TMD signal path.

Figure 10:
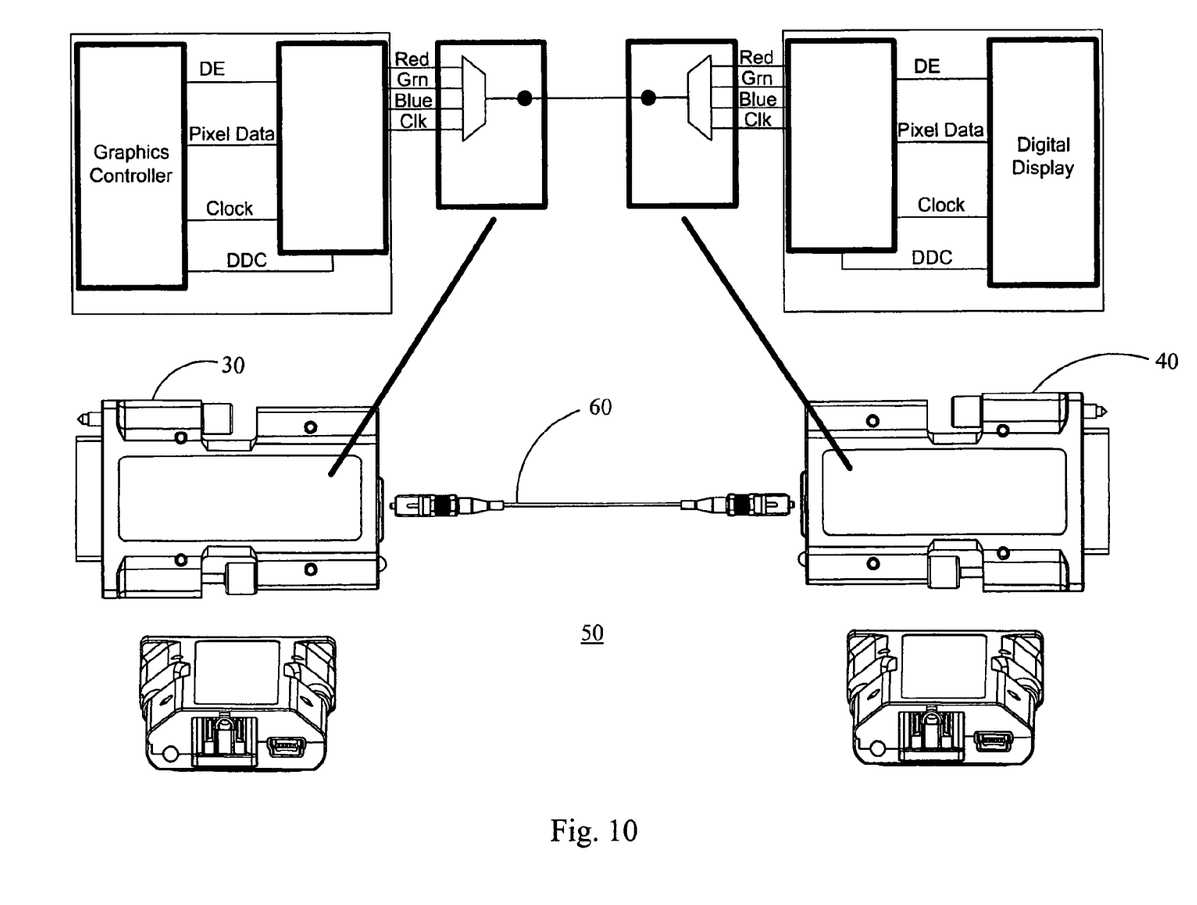
FIG. 10 are schematic and perspective views of a system incorporating the transmitter apparatus of FIG. 1 and the receiver apparatus of FIG. 2.

As shown in FIG. 10, the system or device 50 includes at least one transmitting device 30, at least one receiving device 40, and including a single fiber optical cable 60 interconnecting the two devices. FIG. 10 displays a perspective view of the system and a schematic of the system.

Figure 11:
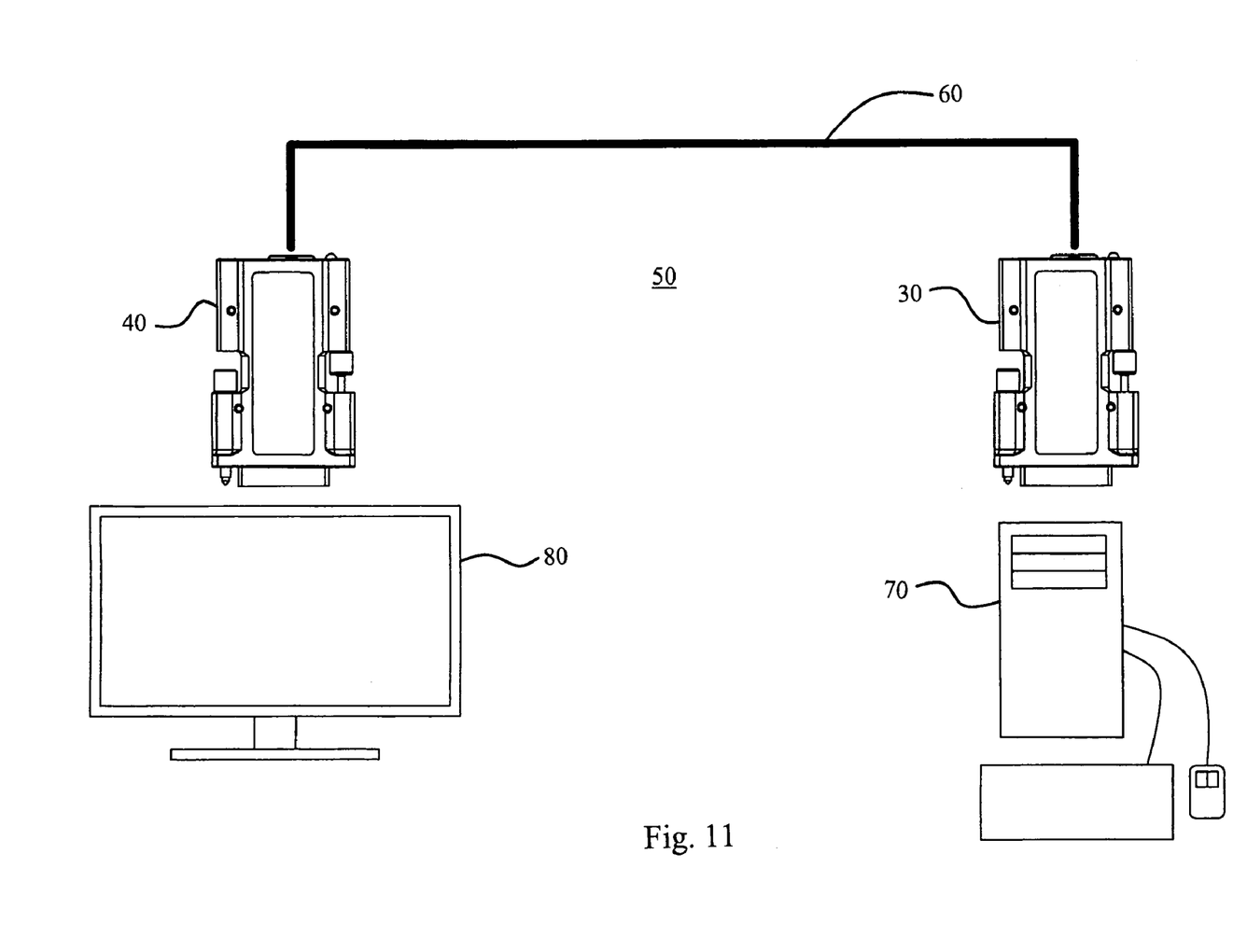
FIG. 11 is a drawing showing an interconnect for the system comprising the transmitter apparatus of FIG. 1 and the receiver apparatus of FIG. 2, which displays information similar to that displayed in FIG. 10.

FIG. 11 is a mixed perspective and schematic view of the system 50 which includes the transmitting device 30, the receiving device 40, and the cable 60. The transmitting device 30 can be plugged into and secured to a computer 70 and the receiving device 40 can be plugged into and secured to a graphics display device 80.

The devices, via an internal microprocessor (in the case of the transmitting device), the physical wired pins of the DVI connector, and the applied number of CWDM wavelengths used in respective transmitting and receiving devices determine the ability of the devices to communicate the maximum resolution and the ability to communicate protocol information between the signal sending device (i.e., Computer graphics card) 70 and the receiving device (i.e., a LCD or Plasma display) 80.

The controlling processor for the signal distribution apparatus includes connectivity to allow DDC information to be read from the inputting transmitter device to be physically stored into a non-volatile memory state for EDID information management. Likewise, the controlling processor for the signal switching apparatus includes connectivity to allow DDC information to be retrieved from the receiving device, typically a monitoring display, and stored in a non-volatile memory state for EDID information management.

The apparatus for the transmitter and receiver units are powered through an onboard USB input. Both the transmitter and receiver require 5VDC for power and receive the appropriate voltages from the source of video (i.e., USB from the computer CPU) and either a USB to AC adapter cable or a USB to monitor cable for the display device.

Utilizing a graphical user interface, the on-board data is formatted into a logical lookup table to allow users to review and manage EDID information as defined by the Video Electronics Standards Association (VESA). The EDID includes, but is not limited to, the manufacturer name, product type, phosphor or filter type, timings supported by the display, display size, luminance and pixel mapping data. Reference further to the document entitled Digital Visual Interface-DVI, revision 1.0 dated 2 Apr. 1999, which was created by the Digital Display Working Group.

Obviously, numerous modifications and variations of the present invention are possible in light of the above teachings. It is therefore to be understood that within the scope of appended claims, the invention may be practiced otherwise than as specifically described herein.

The invention claimed is:

1. A transmitting device adapted to receive at least four electrical TMD signals from a signal sending device, the transmitting device comprising:
   a housing having only one optical port, wherein the only one optical port is adapted to receive only one optical fiber;
   a multichannel transmitter optical subassembly (multichannel TOSA) mechanically associated with the housing;
   a microcontroller electrically associated with the multichannel TOSA; and
   a DVI connector mechanically associated with the housing and electrically associated with the microcontroller and the multichannel TOSA, wherein
   the transmitting device is adapted to convert the least four electrical TMD signals into optical paths that are transmittable, in multiple colored wavelengths, over the only one optical fiber.

2. A transmitting device according to claim 1, further comprising an LED indicator mechanically associated with the housing.

3. A transmitting device according to claim 2, further comprising at least two fasteners mechanically associated with the housing.

4. A transmitting device according to claim 3, further comprising a mini USB connector mechanically associated with the housing.

5. A transmitting device according to claim 4, further comprising a shutter mechanically associated with the housing.

6. A receiving device comprising:
   a housing having only one optical port, wherein the only one optical port is adapted to receive only one optical fiber;
   a multichannel receiver optical subassembly (multichannel ROSA) mechanically associated with the housing; and
   a DVI connector mechanically associated with the housing and electrically associated with the multichannel ROSA, and wherein the receiving device is adapted to convert multiple colored wavelengths, received over the only one optical fiber, into at least four electrical TMD signals.

7. A receiving device according to claim 6, further comprising an LED indicator mechanically associated with the housing.

8. A receiving device according to claim 7, further comprising at least two fasteners mechanically associated with the housing.

9. A receiving device according to claim 8, further comprising a mini USB connector mechanically associated with the housing.

10. A receiving device according to claim 9, further comprising a printed circuit board, wherein the printed circuit board is mechanically associated with the housing.

11. A device comprising:
a transmitting device adapted to receive a first set of at least four electrical TMD signals from a signal sending device, the transmitting device including:
  a first housing having only one optical port,
  a multichannel transmitter optical subassembly (multichannel TOSA) mechanically associated with the first housing,
  a microcontroller electrically associated with the multichannel TOSA, and
  a first DVI connector mechanically associated with the first housing and electrically associated with the microcontroller and the multichannel TOSA;
a receiving device, the receiving device including:
  a second housing having only one optical port,
  a multichannel receiver optical subassembly (multichannel ROSA) mechanically associated with the second housing, and
  a second DVI connector mechanically associated with the second housing and electrically associated with the multichannel ROSA; and
a cable having only one optical fiber, the only one optical fiber in optical communication with the transmitting device and the receiving device, wherein the transmitting device is adapted to convert the first set of at least four electrical TMD signals into optical paths that are transmittable, in multiple colored wavelengths, over the only one optical fiber, wherein
the receiving device is adapted to convert the multiple colored wavelengths, received over the only one optical fiber, into a second set of at least four electrical TMD signals.

12. A device according to claim 11, further comprising a first LED indicator mechanically associated with the first housing.

13. A device according to claim 12, further comprising a first fastener attached to the first housing, and a second fastener attached to the first housing.

14. A device according to claim 13, further comprising a mini USB connector mechanically associated with the first housing.

15. A device according to claim 14, further comprising a first printed circuit board, wherein the first printed circuit board is mechanically associated with the first housing.

16. A device according to claim 15, further comprising a second LED indicator mechanically associated with the second housing.

17. A device according to claim 16, further comprising a third fastener attached to the second housing, and a fourth fastener attached to the second housing.

18. A device according to claim 17, further comprising a second mini USB connector mechanically associated with the second housing.

19. A device according to claim 18, further comprising a second printed circuit board, wherein the second printed circuit board is mechanically associated with the second housing.

20. A device according to claim 11, further comprising a shutter mechanically associated with the first housing.

* * * * *